Patented Sept. 11, 1934

1,973,013

UNITED STATES PATENT OFFICE 1,973,013

WATERINSOLUBLE AZODYESTUFFS

Friedrich Muth, Leverkusen-I. G. Werk, and August Modersohn, Cologne-Mulheim, Germany, assignors to General Aniline Works, Inc., New York, N. Y., a corporation of Delaware No Drawing. Application July 8, 1932, Serial No. 621,520. In Germany July 22, 1931

12 Claims. (Cl. 260—95)

The present invention relates to waterinsoluble dyestuffs, more particularly it relates to dyestuffs which may be represented by the general formula:

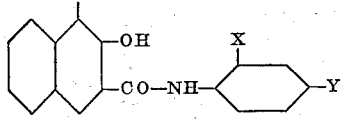

wherein X means hydrogen or alkyl, such as methyl or ethyl, or alkoxy, such as methoxy or ethoxy, Y stands for hydrogen, a halogen atom or an alkoxy group, but X and Y being different from each other, the azo group being attached to the benzene nucleus in the position o- or m- with respect to the sulfone group.

Our dyestuffs are prepared in the usual manner by diazotizing 2-amino- or 3-aminodiphenylsulfone and coupling with a 2-hydroxynaphthoic acid-arylamide of the general formula:

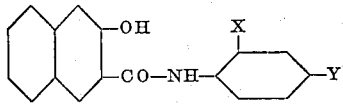

wherein X and Y mean the same as stated above.

The dyestuffs are, when produced in substance, generally orange powders, when produced on the fibre according to the method of producing ice-colors, they yield generally orange shades of good fastness properties.

The invention is illustrated by the following examples, without being limited thereto:

*Example 1.*—50 grams of cotton yarn are treated for half an hour in 1 litre of a bath containing 5 grams of 2-hydroxy-naphthalene-3-carboxylamino-2'-methoxybenzene, 10 ccs. of aqueous caustic soda lye of 38° Bé. and 10 ccs. of Turkey red oil. Then the yarn is squeezed and introduced for half an hour into a diazo solution prepared in the usual manner and containing the diazo compound from 2,35 grams of 2-aminodiphenylsulfone. The yarn is then rinsed, soaped at the boil and dried. A vivid yellowish-orange of excellent fastness to boiling, chlorine and light is thus obtained.

The dyestuff has the following formula:

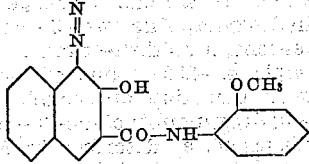

In an analogous manner the diazotized 2-aminodiphenylsulfone yields with:

2 - hydroxynaphthalene - 3 - carboylamino - 4'-chlorobenzene, an orange.

2 - hydroxynaphthalene - 3 - carboylamino - 4'-methoxybenzene, a reddish-orange.

2 - hydroxynaphthalene - 3 - carboylamino - 2'-methoxy-4'-chlorobenzene, an orange.

2 - hydroxynaphthalene - 3 - carboylamino - 2'-methylbenzene, a scarlet.

2 - hydroxynaphthalene - 3 - carboylamino - 2'-methyl-4'-chlorobenzene, an orange.

2 - hydroxynaphthalene - 3 - carboylamino - 2'-methyl-4'-methoxybenzene, a reddish-orange.

2 - hydroxynaphthalene - 3 - carboylamino - 2'-ethoxybenzene, a reddish-orange.

2 - hydroxynaphthalene - 3 - carboylamino - 2-ethylbenzene, a reddish-orange.

*Example 2.*—233 grams of 2-aminodiphenylsulfone are diazotized in the usual manner, and into the diazo solution which has been neutralized by the addition of sodium acetate there is introduced an aqueous soda alkaline solution prepared from 307 grams of 2-hydroxynaphthalene-3-carboylamino-2'-methyl-4'-methoxybenzene. Coupling is soon complete, the orange-red precipitate is filtered, washed and dried.

*Example 3.*—50 grams of cotton yarn are treated for 1 hour in 1 litre of a bath containing 3 grams of 2-hydroxynaphthalene-3-carboylamino-2'-methyl-4'-chlorobenzene, 6 ccs. of Turkey red oil and 9 ccs. of an aqueous caustic soda lye of 38° Bé. Then the yarn is squeezed and introduced for half an hour into a diazo solution prepared in the usual manner and containing a diazo-solution prepared from 2.35 grams of 3- aminodiphenylsulfone. The yarn is then rinsed, soaped at the boil and dried. A clear orange of excellent fastness to boiling, chlorine and light is thus obtained.

The dyestuff has the following formula:

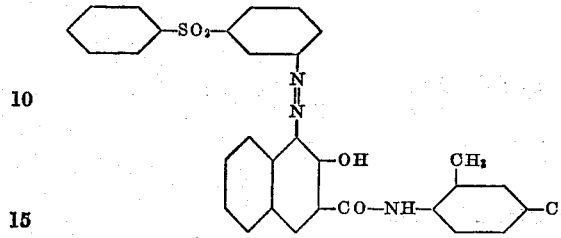

In an analogous manner the diazotized 3-aminodiphenylsulfone yields with:

2 - hydroxynaphthalene - 3 - carboylamino -4'-chlorobenzene, an orange.
2 - hydroxynaphthalene - 3 - carboylamino -4'-methoxybenzene, a brownish-orange.
2 - hydroxynaphthalene - 3 - carboylamino -2'-methoxybenzene, a reddish-orange.
2 - hydroxynaphthalene - 3 - carboylamino -2'-methoxy-4-chlorobenzene, a reddish-orange.
2 - hydroxynaphthalene - 3 - carboylamino -2'-methylbenzene, a reddish-orange.
2 - hydroxynaphthalene - 3 - carboylamino -2'-methyl-4'-methoxybenzene, a reddish-orange.
2 - hydroxynaphthalene - 3 - carboylamino -2'-ethoxybenzene, a reddish-orange.
2 - hydroxynaphthalene - 3 - carboylamino - 2-ethylbenzene, a reddish-orange.

*Example 4.*—233 grams of 3-aminodiphenylsulfone are diazotized and coupled with 277 grams of 2 - hydroxynaphthalene- 3 -carboylamino-2'-methylbenzene, as described in Example 2. An orange-red pigment is thus obtained.

We claim:

1. Waterinsoluble azodyestuffs of the general formula:

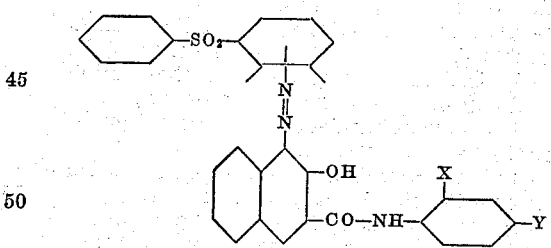

wherein X stands for hydrogen, alkyl or alkoxy, Y stands for hydrogen, alkoxy or a halogen atom, but X and Y being different from each other, the azo group being attached to the benzene nucleus in the position o- or m- with respect to the sulfone group, yielding, when produced on the fibre, generally orange shades.

2. Waterinsoluble azodyestuffs of the general formula:

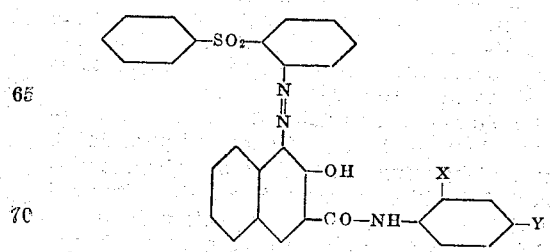

wherein X stands for alkyl or alkoxy, Y stands for hydrogen, alkoxy or chlorine in such a manner that X is not identical with Y and Y stands for hydrogen in case X stands for alkoxy, yielding, when produced on the fibre, orange shades of excellent fastness properties.

3. The azodyestuff of the following formula:

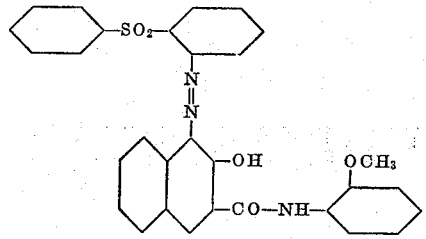

yielding, when produced on the fibre, vivid yellowish-orange shades of excellent fastness to boiling, chlorine and light.

4. The azodyestuff of the following formula:

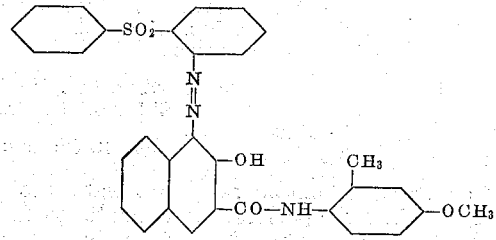

yielding, when produced on the fibre, vivid yellowish-orange shades of excellent fastness to boiling, chlorine and light.

5. Waterinsoluble azodyestuffs of the general formula:

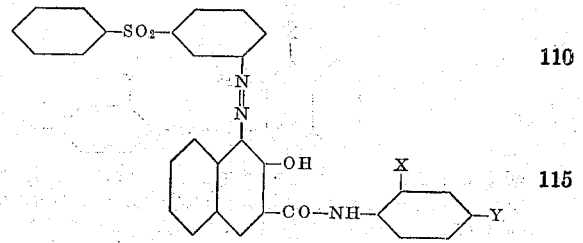

wherein X stands for hydrogen or alkyl, Y stands for hydrogen or chlorine, but X and Y being different from each other, yielding, when produced on the fibre, orange shades of good fastness properties.

6. The azodyestuff of the following formula:

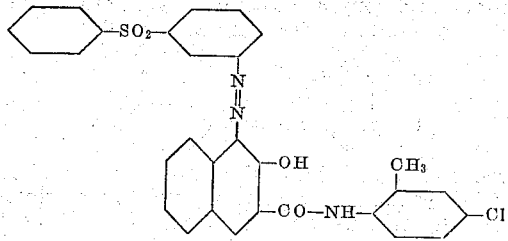

yielding, when produced on the fibre, clear orange shades of excellent fastness to boiling, chlorine and light.

7. Fibre dyed with a dyestuff as claimed in claim 1.
8. Fibre dyed with a dyestuff as claimed in claim 2.
9. Fibre dyed with the dyestuff as claimed in claim 3.
10. Fibre dyed with the dyestuff as claimed in claim 4.
11. Fibre dyed with a dyestuff as claimed in claim 5.
12. Fibre dyed with the dyestuff as claimed in claim 6.

FRIEDRICH MUTH.
AUGUST MODERSOHN.